APPARATUS FOR SYNCHRONIZING TELEVISION AND MOTION PICTURES

Filed Jan. 31, 1963 2 Sheets-Sheet 1

INVENTOR.
OTTO R. NEMETH
BY Elliott & Pastoriza
ATTORNEYS.

INVENTOR.
OTTO R. NEMETH
BY Elliott & Pastoriza
ATTORNEYS.

United States Patent Office
3,239,604
Patented Mar. 8, 1966

3,239,604

APPARATUS FOR SYNCHRONIZING TELEVISION AND MOTION PICTURES

Otto R. Nemeth, 1001 Colorado, Santa Monica, Calif.

Filed Jan. 31, 1963, Ser. No. 255,307
6 Claims. (Cl. 178—6.8)

This invention relates broadly to television operations and more particularly to novel apparatus for synchronizing television with motion pictures to facilitate both the recording on motion picture film of a television program or video tape and the televising or video taping of a program already on motion picture film.

Present day television systems operate essentially at thirty complete scans per second. Each scan combines the two half scans wherein every other line in a 525 line system, for example, is scanned and then the lines in between scanned, the persistence of the television screen material being sufficient so that a complete frame or picture appears. As stated, thirty such complete scannings take place per second, there being a small blank period during which the electron beam moves from the lower right hand portion of the raster pattern back to the upper lefthand portion.

In conventional motion pictures, it has been the practice for many years to operate motion picture cameras and projectors at 24 frames per second. Consequently, there has been a considerable problem involved in attempting to take motion pictures from a monitoring television screen or in television motion pictures projected in a normal manner. For example, if the shutter of a motion picture camera happens to be open to expose a frame of motion picture film during the flyback period of the television scene, there would not result a clear picture on the film frame. If the television scanning proceeds at 30 scans per second, and the motion picture camera operates at 24 frames per second, they will periodically come into and out of synchronism so that the resulting motion pictures may appear brighter or dimmer and faint, vertically moving frame lines may appear. This effect may be diminished by using a longer persistent screen but then the resolution of the picture is decreased.

With the foregoing in mind, it is a primary object of the present invention to provide novel apparatus for synchronizing television with motion pictures.

More particularly, it is an object to provide a novel apparatus for enabling the taking of motion pictures of a televised scene wherein exact synchronism between the camera and pictures appearing on the television screen is maintained and yet the resulting film may be projected at 24 frames per second notwithstanding the television scene photographed was scanned at 30 frames per second.

Another important object is to provide an apparatus for enabling the televising of motion pictures produced from film normally projected at 24 frames per second with perfect synchronism therebetween to the end that high quality televised pictures may be derived from the projection of the said motion picture film.

Still another important object of this invention is to provide a novel means for producing motion picture film from a negative film containing a number of frames per second corresponding to a television scanning rate in such a manner that the resulting produced film may be projected at 24 frames per second so as to be useable in conventional motion picture equipment.

Another object is to provide a novel apparatus for synchronizing television and motion pictures in which higher resolution pictures may be provided on motion picture film and in which high resolution pictures may be televised from motion picture film as compared to prior art methods and apparatus.

A more general object of this invention is to provide a novel apparatus for synchronizing television and motion pictures meeting all of the foregoing objects which is extremely simple, inexpensive and reliable in operation.

Briefly, these and many other objects and advantages of this invention are attained by employing basically, pulse operated motion picture camera and projector equipment. More particularly, in making a motion picture film of a televised scene wherein the televised scene is operated at 30 scans per second and the motion picture film is to be operated at 24 frames per second, 30 synchronizing pulses per second are passed to a pulse operated motion picture camera. These 30 synchronizing pulses correspond to the 30 scans on the monitoring television screen. Every *n*th pulse is interrupted or prevented from reaching the pulse operated camera. In the case where 30 scans per second are employed and the camera is to provide a film which may be projected at 24 frames per second, *n* is equal to 5 so that every fifth pulse is blanked from the camera. With this arangement, there will be exposed in one second six groups of four frames each so that there will result on the film only 24 frames for projection each second rather than 30 notwithstanding that 30 scans were effected during the second involved. The failure to photograph every fifth scan during a 30 scan interval of one second does not appreciably affect the quality of the motion pictures obtained.

Similarly, in televising a motion picture from a film adapted to normally be projected at 24 frames per second, a pulse operated motion picture projector is employed, and the synchronizing pulses corresponding to the scan of the television camera passed to the pulse operated motion picture projector. Every fifth pulse passed to the motion picture projector, however, is blanked so that the motion picture projector will not move one frame out and a successive frame into position when no pulse is received. As a consequence, the film is projected in six groups of four frames each, the fifth frame constituting a repeat of the fourth frame since the film is not moved so that only 24 successive frames are provided per second although there are 30 projected images.

Since in both of the foregoing arrangements, synchronizing pulses from the television system employed are used to operate the camera or projector as the case may be, exact synchronism of a film exposure or projection at the time of a scan is always realized.

The preferred apparatus of the invention includes pulse operated camera and motion picture equipment together with suitable electronic circuitry for effectively blanking every *n*th pulse from a train of synchronizing pulses.

A better understanding of the invention will be had by now referring to the accompanying schematic drawings, in which.

Figure 1:
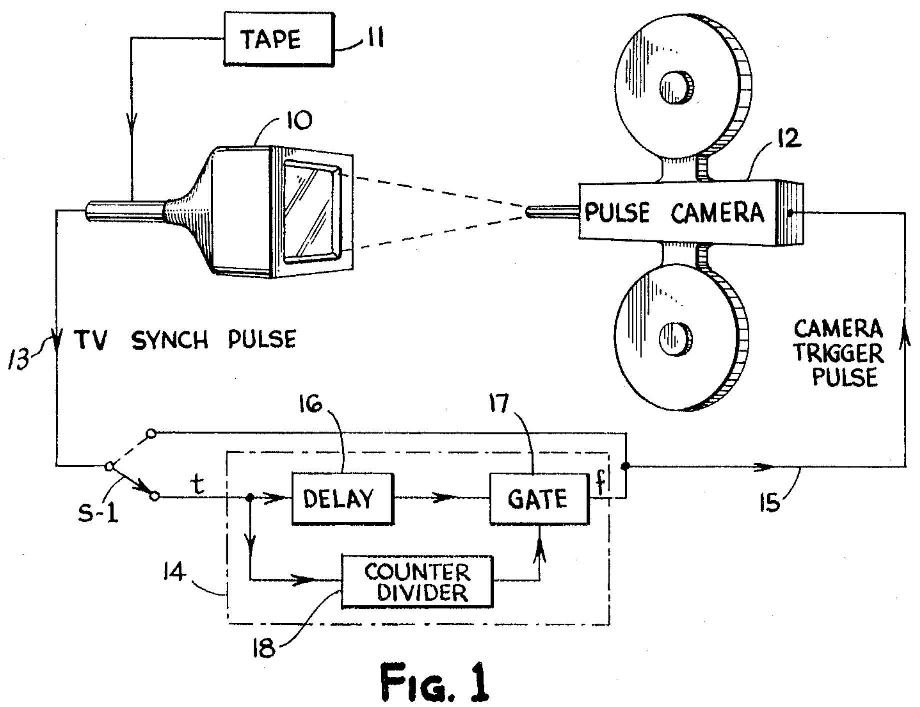
FIGURE 1 is a schematic illustration of the apparatus for recording on motion picture film a television program from a monitoring television screen in accordance with the invention.

Referring first to FIGURE 1, there is shown a monitoring television tube 10 which may be used to reproduce a televised program as it is being televised or alternatively reproduce a previously televised program from a magnetic tape 11. Assuming that it is wished to record the televised program on motion picture film in such a manner that the film may be projected by conventional motion picture equipment at the rate of 24 frames per second, there is provided, in accordance with the instant invention, a special type of motion picture camera 12. In this camera, a frame is exposed only in response to a pulse of electrical energy. Such a pulse operated camera is fully disclosed and described in my co-pending application Serial No. 217,388, filed August 16, 1962, for Photographic Apparatus. Thus, the pulse camera 12 will only expose a frame of film when an electrical pulse is received so that a succession of exposures as is the case in taking motion pictures will only occur in response to a succession of pulses, each exposure corresponding to each pulse.

As stated heretofore, conventional television is scanned at the rate of 30 scans per second. In accordance with the instant invention, the synchronizing of the exposure of the film in the pulse camera 12 with the 30 scans per second from the monitoring television tube 10 is accomplished by passing 30 synchronizing pulses per second from an output line 13 to the pulse camera 12. Since, however, it is only permitted that 24 frames per second be exposed in the pulse camera 12, and the 30 synchronizing pulses are passed through a blanking circuit designated generally by the numeral 14 which serves to blank or remove every fifth pulse. As a consequence, an average of only 24 pulses actually reaches the pulse camera through the line 15 so that an average of only 24 frames per second are exposed.

The blanking circuit 14 itself may comprise a simple delay line 16 for receiving the 30 scanning pulses per second and a gate 17 through which these pulses are adapted to pass. Also provided is a counter-divider circuit which has the property of providing an output pulse for every four input pulses received. This output pulse is essentially positioned in time to correspond to every fifth pulse of the synchronizing pulses passed through the circuit and may be applied to the gate 17 to render the gate inoperative or closed for every fifth pulse.

Figure 2:
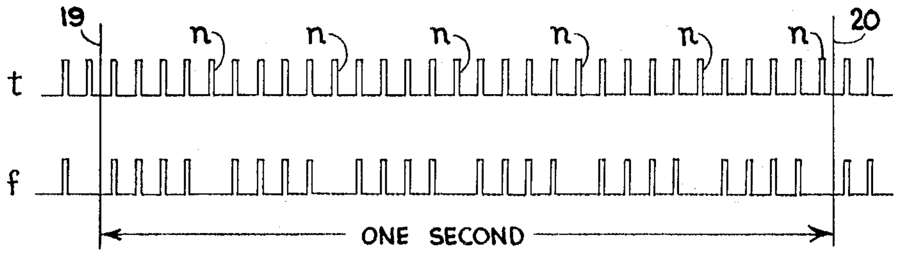
FIGURE 2 illustrates a series of synchronizing pulses useful in explaining the operation of the apparatus of FIGURE 1.

A clearer understanding of the foregoing will be had by referring to FIGURE 2 wherein there is illustrated in the upper line of pulses, $t$ scanning pulses per second, which in the particular example chosen, constitutes 30 such pulses per second. These are the pulses that are applied to the delay 16 and the counter-divider 18 of the blanking circuit 14. If a one second interval is considered, there will be 30 of the $t$ pulses as shown between the vertical lines 19 and 20 in FIGURE 2. Since, however, the fifth pulse is blanked, the output of the line 15 passed to the pulse camera 12 will appear as shown in the second row of pulses in FIGURE 2. These pulses are designated $f$. There will be noted that there are six groups of four pulses totaling 24 pulses actually passed to the pulse camera. Since the camera will only move the film one frame in response to each pulse received, there will appear 24 consecutive frames on a film for each second of operation. Accordingly, when the film from the camera 12 is developed and projected by normal projection equipment operating at 24 frames per second, the desired picture will result.

In connection with the foregoing, it is to be noted that if sound is to be recorded on the film in the pulse camera 12 at the time the camera is taking pictures of the monitoring screen, the recording head for the sound will be disposed juxtaposed a portion of film fed into a uniformly moving sprocket wheel prior to the loop portion which feeds into the pull-down mechanism. Thus, while the pull-down mechanism operates in successive groups of four rapid frames, six times each second, the average film speed will still only be 24 frames per second, and since the sprocket wheel feed moves uniformly, uniform sound will be recorded on the film for proper projection by a conventional motion picture projector operating at 24 frames per second. There is thus not introduced any problems with respect to sound.

While it is true that every fifth scan of the monitoring television tube 10 is omitted from the film in the pulse camera, no appreciable impairment of the quality of the picture results. In fact, a greatly improved picture results since each of the 24 frames exposed each second is exposed at precisely the correct time corresponding to the 24 out of 30 scans selected per second. This synchronism is a direct necessity from the fact that the synchronizing pulses for the scanning mechanism in the monitoring tube 10 are the same pulses which drive the pulse camera 12.

In order to generalize the foregoing operation with respect to any scan rate and any motion picture taking rate, if $t$ represents the number of scans per second and $f$ represents the number of frames to be exposed on the film per second, then the blanking circuit 14 must be designed to blank out every nth pulse where:

$$n=\frac{t}{t-f}$$

With this formula, it will be evident that when $t=30$ for the number of scans per second and $f=24$ for the number of frames per second, $n$ will equal 5. The various $n$th pulses to be blanked are designed by the small letter $n$ in FIGURE 2.

It should be understood that in some instances if a pulse operated projector is employed or any conventional projector employed which may be operated at 30 frames per second rather than 24 frames per second, the film itself could be exposed at the rate of 30 frames per second. In this instance, $t$ is equal to $f$ and the blanking circuit 14 would be omitted. In order that such an operation may readily be carried out, there is illustrated in FIGURE 1 a switch S–1 which may be thrown to the dotted line position to pass the $t$ synchronizing pulses directly to the pulse camera 12. When such a direct synchronism is provided, the film in the pulse camera 12 will be exposed at 30 frames per second and thus for a given scene photographed will be longer than conventional film exposed at the rate of 24 frames per second. However, this longer film may be converted to film capable of being projected in a conventional manner at 24 frames per second by forming positive prints from a negative film. This operation is illustrated in FIGURE 3.

Figure 3:
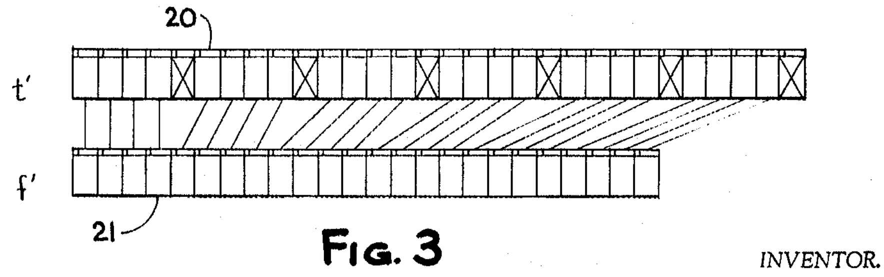
FIGURE 3 illustrates negative and positive film strips used in accordance with one part of the invention.

Thus, referring to FIGURE 3, there is shown a film strip 20 wherein there are provided $t'$ or 30 frames which were taken in one second. If it is now desired to print a positive film to be projected at 24 frames per second from this negative film, every fifth frame in the negative film may be planked as indicated by the cross and the positive film have successive frames printed to correspond to the remaining frames shown by the connecting lines between the two film strips 20 and 21. This printing operation may be carried out by pulse operated printing equipment wherein pulses with suitable fifth pulses blanked are connected to the printing machines. There thus results a strip of film 21 having only 24 frames per second. This film may then be projected with normal motion picture projection equipment. Again, while it is true that an average of six frames per second are omitted from the 24 frame film, no appreciable change in the overall quality is detectable to the eye.

Figure 4:
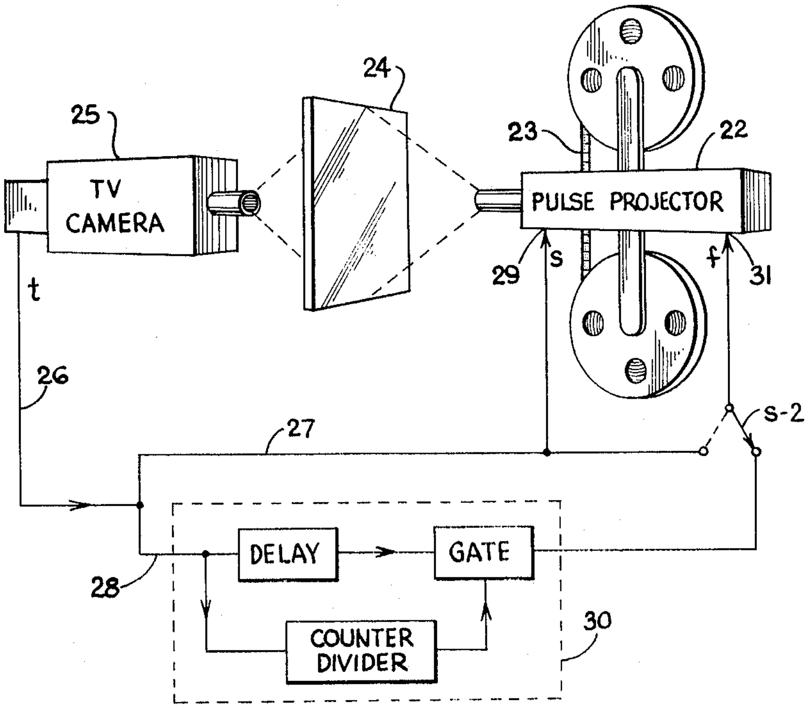
FIGURE 4 is a schematic showing of an apparatus for televising motion pictures in accordance with the invention; and, FIGURE 5 illustrates a series of synchronizing pulse diagrams useful in explaining the operation of the apparatus of FIGURE 4.

Referring now to FIGURE 4, there is illustrated an apparatus for enabling the televising at 30 scans per second of a motion picture film which is normally designed to be projected at 24 frames per second. In this system, there is provided a pulse operated propector 22 which will project a single frame of film 23 in response to each pulse received. As shown, the projected pictures may be thrown onto a screen 24 which in turn is televised by a television camera 25. In order to realize the desired synchronization between the 30 scan television camera 25 and the projected film from the pulse projector 22, $t$ synchronizing pulses per second are passed through a line 26 from the camera 25 to the pulse projector 22. These synchronizing pulses are passed into first and second paths 27 and 28. The first path 27 passes directly to a first input 29 in the pulse projector 22. The second path 28 in turn passes through a pulse blanking circuit 30 and thence to a second input 31 in the pulse projector 22. The blanking circuit 30 is identical to that described in conjunction with FIGURE 1 at 14 and serves to blank out every *n*th or fifth pulse when considering conventional television and projection equipment.

The first input 29 of the pulse projector operates the shutter mechanism in response to every received pulse so that a frame will be projected each time a pulse is received. The second input 31 on the other hand operates the pull-down mechanism to move a successive frame into position each time a pulse is received. Thus, in the operation of the equipment of FIGURE 4, the shutter 29 is operated to correspond to 30 frames per second in response to the synchronizing pulses arriving in the line 27 from the television camera 25. However, the pulses received at the second input 31 appear in groups of four with every fifth pulse blank so that the pull-down mechanism will operate successively four times and then will not operate the fifth time. However, there will still be projected the particular frame positioned in the camera at this time of the fifth pulse so that every fifth frame will be a repeat of the fourth frame previously projected. There is thus essentially provided a projection of 30 frames per second although only 24 successive frames move through the pulse projector.

Figure 5:
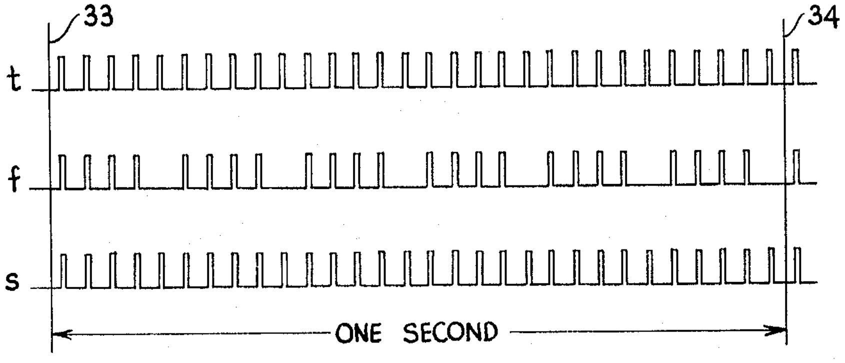

The foregoing situation may better be understood by referring to FIGURE 5 which illustrates the $t$ synchronizing pulses between the vertical lines 33 and 34 denoting a one second interval. The $f$ pulses applied to the second input 31 from the output of the blanking circuit 30 are illustrated below the $t$ pulses and as shown every fifth pulse is blanked so that only 24 such pulses appear between the vertical lines 33 and 34 to move the film 24 successive frames. As stated at the point where a blank occurs, the film remains stationary so that the frame in position at this time is projected twice. The lower line of synchronizing pulses designated S pass to the shutter mechanism at the first input 29 so that the shutter will operate to correspond to 30 frames per second.

From the foregoing, it will thus be evident that the film 23 will move through the pulse projector 22 at an average rate of 24 frames per second although 30 frames per second will actually be projected on the screen 24. Thus, absolute synchronism is realized with the thirty scans per second of the television camera.

As a consequence of the exact synchronization between the scan period and the period of exposure to a film or alternatively the period of exposure of the television scanning camera to a projected frame of film, very high resolution results. Thus, the normal screen persistence is not at all necessary in the case of the taking of motion pictures of a monitoring screen since the optical information is recorded on each frame of film only during the exact scanning period. By decreasing the persistence, far greater resolution is realized in the picture, and, in fact, the persistence need only extend for the scan period and not persist through the flyback time.

By employing a substantially non-persistent screen, the monitoring television screen can be made to be dark during flyback time. As a consequence, the motion picture camera need not employ any shutter since no light will be entering the camera at this time. Thus, all of the mechanical apparatus heretofore employed in a pulse operated camera to operate a shutter is unnecessary when the camera is employed in the manner described with a non-persistence screen for the recording of a televised scene.

Finally, it should be understood that since pulse operated camera and projector equipment is employed, it is perfectly feasible to photograph television shows at a frame rate of 30 per second so that no pulse blanking is necessary. The film after development may then be projected at 30 frames per second by throwing switch S–2 in FIGURE 4 and in the event it were desired to project the film without televising in a normal manner such as 24 frames per second, a reprint of the film may be made in accordance wih the teachings described in conjunction with FIGURE 3.

It will be appreciated from the foregoing description that the present invention has thus provided novel apparatus for realizing perfect synchronization between television and motion pictures. The operation is extremely simple, inexpensive, and very reliable, the primary features of the invention being realizable as the consequence of the use of pulse operated camera and projector equipment.

While the invention has been described in conjunction with 30 scan frames per second for television and 24 projection or exposure frames per second for motion pictures, it should be understood that the principles are applicable to the other scan rates and other projection and exposure rates.

What is claimed is:

1. An apparatus for synchronizing the filming of motion pictures of a given scene with the televising of such scene wherein the filming is operated at $f$ frames per second and the televising is scanned at $t$ scans per second, comprising, in combination: a monitoring television screen for reproducing said given scene at $t$ scans per second; a pulse operated motion picture camera having film therein and operative to exposure one frame of said film to said monitoring television screen in response to each pulse of electrical energy received; means for passing $t$ synchronizing pulses of electrical energy per second corresponding to said scans to said motion picture camera to operate said camera; and means for blanking every $n$th pulse passed to said camera, where $$n=\frac{t}{t-f}$$

whereby only $f$ frames per second are exposed for every $t$ synchronizing pulses passed to said camera.

2. An apparatus according to claim 1, in which said means for blanking every $n$th pulse comprises: a delay means receiving said $t$ synchronizing pulses; a gate connected to the output of said delay means; and a counter-divider circuit connected to receive said $t$ synchronizing pulses at the same time as said delay means and responsive to every $n-1$ successive input pulses to provide a single output pulse, corresponding in time position to the next successive input pulse, the output of said counter-divider being connected to said gate so that said single output pulse closes said gate whereby the output of said gate constitutes said $t$ synchronizing pulses with the exception of every $n$th pulse.

3. An apparatus according to claim 2, in which $t=30$, $f=24$, and $n=5$.

4. An apparatus for synchronizing the televising of a motion picture film of a given scene with the projecting of said motion picture film of said scene wherein the televising is scanned at $t$ frames per second and the motion picture is projected at $f$ successive frames per second, comprising, in combination: a pulse operated motion picture projector having first and second inputs; means for passing $t$ synchronizing pulses per second corresponding to said $t$ scans per second to said first input; a pulse blanking circuit means; means for also passing said $t$ synchronizing pulses through said pulse blanking circuit means and thence to said second input, said pulse operated motion picture projector being responsive at said first input to each received pulse to project a frame positioned in said projector and responsive at said second input to each received pulse to move the film in said projector to the next successive frame, said pulse blanking circuit means interrupting every $n$th pulse of said pulses passing to said second input so that every $(n-1)$th frame of said motion picture film is projected twice, where $$n=\frac{t}{t-f}$$

whereby only $f$ successive frames are moved pre second.

5. An apparatus according to claim 4, in which said pulse blanking circuit means comprises a delay means receiving said $t$ synchronizing pulses; a gate connected to the output of said delay means; and a counter divider circuit connected to also receive said $t$ synchronizing pulses at the same time as said delay means and responsive to every $n-1$ successive input pulses to provide a single output pulse corresponding in time position to the $n$th pulse, the output of said counter divider being connected to said gate so that said single output pulse closes said gate whereby the output of said gate passed to said second input means includes said $t$ synchronizing pulses except every $n$th pulse.

6. An apparatus according to claim 5, in which $t=30$, $f=24$, and $n=5$.

References Cited by the Examiner

UNITED STATES PATENTS

| | | | |
|---|---|---|---|
| 2,560,919 | 7/1951 | Bedford | 178—6.7 |
| 2,735,333 | 2/1956 | Mitchell | 178—7.2 |
| 2,859,275 | 11/1958 | Maurer | 178—7.4 |
| 2,908,754 | 10/1959 | Purington et al. | 178—714 |
| 2,922,841 | 1/1960 | Graziano | 178—7.2 |
| 2,944,109 | 7/1960 | Evans | 178—7.2 |
| 3,030,441 | 4/1962 | Nemeth | 178—6.7 |
| 3,118,971 | 1/1964 | Lowell | 178—6.7 |

FOREIGN PATENTS

| | | |
|---|---|---|
| 656,292 | 9/1947 | Great Britain. |

DAVID G. REDINBAUGH, *Primary Examiner.*

T. G. KEOUGH, J. A. ORSINO, *Assistant Examiner.*